US011881335B2

(12) United States Patent
Skogman et al.

(10) Patent No.: US 11,881,335 B2
(45) Date of Patent: Jan. 23, 2024

(54) SEMICONDUCTIVE POLYMER COMPOSITION

(71) Applicant: BOREALIS AG, Vienna (AT)

(72) Inventors: Fredrik Skogman, Stenungsund (SE);
Emil Hjärtfors, Stenungsund (SE);
Annika Smedberg, Stenungsund (SE);
Daniel Nilsson, Stenungsund (SE)

(73) Assignee: BOREALIS AG, Vienna (AT)

( * ) Notice: Subject to any disclaimer, the term of this patent is extended or adjusted under 35 U.S.C. 154(b) by 225 days.

(21) Appl. No.: 16/771,301

(22) PCT Filed: Dec. 18, 2018

(86) PCT No.: PCT/EP2018/085530
§ 371 (c)(1),
(2) Date: Jun. 10, 2020

(87) PCT Pub. No.: WO2019/121705
PCT Pub. Date: Jun. 27, 2019

(65) Prior Publication Data
US 2021/0366631 A1    Nov. 25, 2021

(30) Foreign Application Priority Data
Dec. 18, 2017   (EP) .................................... 17208199

(51) Int. Cl.
| H01B 9/00 | (2006.01) |
| C08L 23/04 | (2006.01) |
| C08L 33/08 | (2006.01) |
| C08L 33/10 | (2006.01) |
| C08K 3/04 | (2006.01) |
| H01B 9/02 | (2006.01) |
| C08K 5/134 | (2006.01) |
| C08K 5/14 | (2006.01) |
| H01B 3/44 | (2006.01) |

(52) U.S. Cl.
CPC ............... *H01B 9/027* (2013.01); *C08K 3/04* (2013.01); *C08K 5/1345* (2013.01); *C08K 5/14* (2013.01); *H01B 3/441* (2013.01); *C08L 23/04* (2013.01); *C08L 33/08* (2013.01); *C08L 33/10* (2013.01)

(58) Field of Classification Search
CPC .......... C08L 23/04; C08L 33/08; C08L 33/10; C08L 2203/202; C08K 5/14; C08K 5/0025; C08K 3/04
See application file for complete search history.

(56) References Cited

U.S. PATENT DOCUMENTS

| 3,401,020 A | 9/1968 | Kester et al. |
| 3,922,335 A | 11/1975 | Jordan et al. |
| 4,340,577 A | 7/1982 | Sugawara et al. |
| 4,391,789 A | 7/1983 | Estopinal |
| 6,673,448 B2* | 1/2004 | Gustafsson ............... H01B 1/24 252/511 |
| 6,706,791 B2* | 3/2004 | Tsukada ............... C08K 5/1345 524/495 |
| 6,797,886 B1* | 9/2004 | Gustafsson ............ H01B 3/441 174/110 R |
| 7,767,741 B2* | 8/2010 | Nylander ................. H01B 1/24 252/511 |
| 8,269,109 B2* | 9/2012 | Hampton ............... H01B 3/441 174/120 SC |
| 8,425,806 B2* | 4/2013 | Noyens .................. B82Y 10/00 252/511 |
| 9,296,883 B2* | 3/2016 | Fagrell .................. C08F 210/02 |
| 2002/0032258 A1 | 3/2002 | Tsukada et al. |
| 2007/0149707 A1* | 6/2007 | Nakata ............... C08L 23/0846 525/192 |
| 2009/0227717 A1* | 9/2009 | Smedberg ............... C08L 23/02 524/331 |
| 2012/0018190 A1* | 1/2012 | Smedberg ............... C08L 23/06 174/120 SC |
| 2014/0199547 A1* | 7/2014 | Jamieson ............... H01B 3/004 252/511 |
| 2016/0311998 A1* | 10/2016 | Uematsu ............. H01B 7/0216 |

FOREIGN PATENT DOCUMENTS

| EP | 0629222 B1 | 9/1999 |
| EP | 1125306 B1 | 8/2001 |
| EP | 1695996 B1 | 8/2006 |

(Continued)

OTHER PUBLICATIONS

International Search Report and Written Opinion dated Mar. 15, 2019, from International Application No. PCT/EP2018/085530, 13 pages.
J. Randall, Macromol. Sci., Rev. Macromol. Chem. Phys. 1989, C29, 201-317. "A review of high resolution liquid 13carbon nuclear magnetic resonance characterizations of ethylene-based polymers." Journal of Macromolecular Science—Reviews in Macromolecular Chemistry and Physics 29.2-3.

*Primary Examiner* — Rip A Lee

(74) *Attorney, Agent, or Firm* — Meunier Carlin & Curfman LLC

(57) ABSTRACT

The invention relates to a semiconductive polymer composition comprising a polymer component, a conducting component and a crosslinking agent, wherein the polymer component comprises a polar polyethylene and the crosslinking agent comprises an aliphatic mono- or bifunctional peroxide or, alternatively, a monofunctional peroxide containing an aromatic group, and the crosslinking agent is present in an amount which is Z wt %, based on the total amount (100 wt %) of the polymer composition, and $Z_1 \leq Z \leq Z_2$, wherein $Z_1$ is 0.01 and $Z_2$ is 5.0, an article being e.g. a cable, e.g. a power cable, and processes for producing a semiconductive polymer composition and an article; useful in different end applications, such as wire and cable (W&C) applications.

17 Claims, No Drawings

(56) References Cited

FOREIGN PATENT DOCUMENTS

| | | |
|---|---:|---:|
| EP | 1731558 A1 | 12/2006 |
| WO | 1993/008222 A1 | 4/1993 |
| WO | 2000/038895 A1 | 7/2000 |
| WO | 2006/131266 A1 | 12/2006 |
| WO | 2009/053042 A1 | 4/2009 |
| WO | 2010/112333 A1 | 10/2010 |
| WO | 20150090595 A1 | 6/2015 |

\* cited by examiner

SEMICONDUCTIVE POLYMER COMPOSITION

FIELD OF INVENTION

The present invention relates to a semiconductive polymer composition comprising a polymer component, a conducting component and a crosslinking agent, an article comprising semiconductive layer(s) which is/are obtained from the semiconductive polymer composition, the article may, for example, be a cable, e.g. a power cable, processes for producing the semiconductive polymer composition and the article which comprises use of a semiconductive polymer composition.

BACKGROUND ART

In wire and cable (W&C) applications a typical cable comprises at least one conductor surrounded by one or more layers of polymeric materials. In power cable applications, including medium voltage (MV), high voltage (HV) and extra high voltage (EHV) applications, said conductor is surrounded by several layers including an inner semiconductive layer, an insulation layer and an outer semiconductive layer, in that order. To these layers, further layer(s) may be added, such as screen(s) and/or auxiliary barrier layer(s), e.g. one or more water barrier layer(s) and one or more jacketing layer(s). Furthermore, the electrical properties, which are of importance, may differ in different cable applications, as is the case between alternating current (AC) and direct current (DC) cable applications.

Typical cables are commonly produced by extruding the layers on a conductor. Such polymeric semiconductive layers are well known and widely used in dielectric power cables rated for voltages greater than 6 kilo volt. These layers are used to provide layers of intermediate resistivity between the conductor and the insulation, and between the insulation and the ground or neutral potential.

Further, it is also known that crosslinking of polymers, e.g. polyolefins, substantially contributes to an improved heat and deformation resistance, mechanical strength, chemical resistance and abrasion resistance of a polymer. Therefore crosslinked polymers are widely used in different end applications, such as in the mentioned wire and cable (W&C) applications.

Due to benefits, mentioned herein, which are achievable with crosslinking, the insulating layer and the semiconducting layers in cable applications are typically made using crosslinkable polymer compositions. The polymer compositions in a formed layered cable application are then crosslinked.

Crosslinking can be affected i.a. by radical reaction using radiation or free radical generating agents, also called crosslinking agents. Examples of such free radical generating agents are peroxides including inorganic and organic peroxides. Crosslinking using peroxide is known as peroxide crosslinking technology. A further well known crosslinking method is crosslinking functional groups, e.g. by hydrolysing hydrolysable silane groups, which are linked to polymer. In case of crosslinkable semiconductive layer materials using crosslinking via radical reaction, said layer composition may also comprise a crosslinking agent, such as peroxide, which is preferably added onto the pellets after producing the polymer pellets as described e.g. in WO00038895 of Pirelli.

The purpose of a semiconductive layer is to prolong the service life, i.e. long term viability, of a power cable i.a. by preventing partial discharge at the interface of conductive and dielectric layers.

WO2009053042A1 relates to a semiconductive polymer composition, to a method for preparing said semiconductive polymer composition, to its use for the production of a semiconductive layer of an electric power cable, and to an electric power cable comprising at least one semiconductive layer, which layer comprises the above mentioned semiconductive polymer composition. Further, WO2009053042A1 provides a semiconductive polymer composition which exhibit improved surface smoothness, and has good balance with other properties needed for a semiconductive polymer material.

U.S. Pat. No. 6,706,791 relates to a power cable having a semiconductive shield and moisture cured insulation. Further, the power cable in U.S. Pat. No. 6,706,791 Is aimed to avoiding drawbacks of peroxide and moisture cured shields.

EP1125306B1 relates to electric cables and particularly semiconducting layers of electric cables, preferably to crosslinked, semiconducting layers of electric cables, and more preferably to crosslinked, inner and non-strippable outer semiconducting layers of electric cables. Further, in EP1125306B1 is used specific, non-uniform or heterogeneous ethylene-alkyl (meth)acrylate copolymers, preferably heterogeneous ethylene copolymers with methyl (meth)acrylate (M(M)A), ethyl (meth)acrylate (E(M)A), (iso-)propyl (meth)acrylate (P(M)A) or butyl (meth)acrylate (B(M)A), as the ethylene copolymer in the semiconducting layer.

When the crosslinking is performed with crosslinking agents, the crosslinking agents decompose generating free radicals. Such crosslinking agents, e.g. peroxides, are conventionally added to the polymeric material prior to, or during, the extrusion of the cable. Said crosslinking agent should preferably remain stable during the extrusion step. The extrusion step should preferably be performed at a temperature low enough to minimize the early decomposition of the crosslinking agent, but high enough to obtain proper melting and homogenisation of the polymer composition. If a significant amount of crosslinking agent, e.g. peroxide, decomposes already in the extruder, and thereby initiates premature crosslinking, it will result in formation of, so-called, "scorch", i.e. inhomogeneity, surface unevenness and possibly discolouration in the different layers of the resultant cable. Therefore, any significant decomposition of crosslinking agents, i.e. free radical forming agents, during extrusion should be avoided. Instead, the crosslinking agents should ideally decompose merely in a subsequent crosslinking step at elevated temperature. The elevated temperature will increase the decomposition rate of the crosslinking agents and will thus increase crosslinking speed, and a desired, i.e. a target, crosslinking degree may be reached faster.

Moreover, when a polymer composition in, for example, a cable, is crosslinked, the decomposition of the crosslinking agents, e.g. peroxides, during the crosslinking, will further also result in formation of peroxide decomposition products. Some of the peroxide decomposition products are volatile, and their main component is methane if the types of peroxides that typically are used for crosslinking are used. The peroxide decomposition products remain mostly captured within the polymer composition of, for example, a cable, after crosslinking. This causes, e.g. problems in view of the cable manufacturing process as well as in view of the quality of the final cable.

Especially MV, HV and EHV power cables must have layers of high quality in order to help safety during installation and in end uses of said cables. In installation, for example, it is of importance to avoid that the captured decomposition products e.g. flammable methane and ethane, ingnite, for example when end caps are removed. In service, volatile peroxide decomposition products formed in a cable during a crosslinking step can create a gas pressure and thus cause defects in the shielding and in the joints. E.g. when a cable core is equipped with a metal barrier, then the gaseous products can exert a pressure, especially on the joints and terminations, whereby a system failure may occur. Thus, the level of these volatile peroxide decomposition products needs to be reduced, to a low enough level, before subsequent cable production steps can take place.

Thus, there is clearly a continuous need to provide new semiconductive polymer compositions with improved properties.

DESCRIPTION OF THE INVENTION

The present invention relates to a semiconductive polymer composition, comprising a polymer component, a conducting component and a crosslinking agent, wherein the polymer component comprises a polar polyethylene and the crosslinking agent comprises aliphatic monofunctional peroxide and/or aliphatic bifunctional peroxide and/or monofunctional peroxide containing an aromatic group, and the crosslinking agent is present in an amount which is Z wt %, based on the total amount (100 wt %) of the semiconductive polymer composition, and $Z_1 \leq Z \leq Z_2$, wherein $Z_1$ is 0.01 and $Z_2$ is 5.0.

The semiconductive polymer composition according to the present invention wherein the crosslinking agent comprises an aliphatic mono- or bifunctional peroxide or, alternatively, a monofunctional peroxide containing an aromatic group, has surprisingly shown to exhibit both an improved scorch performance and a reduction in methane formation.

Further, the semiconductive polymer composition of the present invention is crosslinkable and is crosslinked via radical reaction, whereby said the semiconductive polymer composition comprises the crosslinking agent comprising the aliphatic mono- or bifunctional peroxide or, alternatively, the monofunctional peroxide containing an aromatic group.

Furthermore, the semiconductive polymer composition of the present invention comprises said crosslinking agent in an amount which is Z wt %, based on the total amount (100 wt %) of the semiconductive polymer composition, and $Z_1 \leq Z \leq Z_2$, wherein $Z_1$ is 0.01 and $Z_2$ is 5.0.

In a further embodiment according to the present invention, the crosslinking agent comprises an aliphatic mono- or bifunctional peroxide or, alternatively, a monofunctional peroxide containing an aromatic group.

In further embodiments of the present invention, $Z_1$ is 0.01 and $Z_2$ is 4.5 wt %, e.g. $Z_1$ is 0.1 and $Z_2$ is 4 wt %, for example $Z_1$ is 0.1 and $Z_2$ is 2 wt %, e.g. $Z_1$ is 0.1 and $Z_2$ is 1 wt %, for example $Z_1$ is 0.1 and $Z_2$ is 0.9 wt %, e.g. $Z_1$ is 0.1 and $Z_2$ is 0.8 wt %, for example $Z_1$ is 0.1 and $Z_2$ is 0.7 wt %, e.g. $Z_1$ is 0.1 and $Z_2$ is 0.6 wt %, for example $Z_1$ is 0.1 and $Z_2$ is 0.55, e.g. $Z_1$ is 0.2 and $Z_2$ is 0.8 wt %, for example $Z_1$ is 0.2 and $Z_2$ is 0.7 wt %, e.g. $Z_1$ is 0.2 and $Z_2$ is 0.6 wt %, for example $Z_1$ is 0.2 and $Z_2$ is 0.55 wt %, e.g. $Z_1$ is 0.3 and $Z_2$ is 0.8 wt %, for example $Z_1$ is 0.3 and $Z_2$ is 0.7 wt %, e.g. $Z_1$ is 0.3 and $Z_2$ is 0.6 wt %, for example $Z_1$ is 0.3 and $Z_2$ is 0.55 wt %, e.g. $Z_1$ is 0.35 and $Z_2$ is 0.6 wt %, for example $Z_1$ is 0.35 and $Z_2$ is 0.55 wt %, e.g. $Z_1$ is 0.4 and $Z_2$ is 0.6 wt %, or, alternatively, for example $Z_1$ is 0.4 and $Z_2$ is 0.55 wt % of the amount of the semiconductive polymer composition.

Still further embodiments of the present invention are disclosed wherein $Z_1$ is 0.1 and $Z_2$ is 1.5 wt %, for example $Z_1$ is 0.1 and $Z_2$ is 1.0 wt %, e.g. $Z_1$ is 0.1 and $Z_2$ is 0.9 wt %, e.g. $Z_1$ is 0.1 and $Z_2$ is 0.8 wt %, for example $Z_1$ is 0.1 and $Z_2$ is 0.7 wt %, or, alternatively, for example $Z_1$ is 0.1 and $Z_2$ is 0.6 wt %.

Even further embodiments of the present invention are disclosed wherein $Z_1$ is 0.2 and $Z_2$ is 1.5 wt %, for example $Z_1$ is 0.2 and $Z_2$ is 1.0 wt %, e.g. $Z_1$ is 0.2 and $Z_2$ is 0.9 wt %, e.g. $Z_1$ is 0.2 and $Z_2$ is 0.8 wt %, for example $Z_1$ is 0.2 and $Z_2$ is 0.7 wt %, or, alternatively, for example $Z_1$ is 0.2 and $Z_2$ is 0.6 wt %.

Still further embodiments of the present invention are disclosed wherein $Z_1$ is 0.3 and $Z_2$ is 1.5 wt %, for example $Z_1$ is 0.3 and $Z_2$ is 1.0 wt %, e.g. $Z_1$ is 0.3 and $Z_2$ is 0.9 wt %, e.g. $Z_1$ is 0.3 and $Z_2$ is 0.8 wt %, for example $Z_1$ is 0.3 and $Z_2$ is 0.7 wt %, or, alternatively, for example $Z_1$ is 0.3 and $Z_2$ is 0.6 wt %.

Even further embodiments of the present invention are disclosed wherein $Z_1$ is 0.35 and $Z_2$ is 1.5 wt %, for example $Z_1$ is 0.35 and $Z_2$ is 1.0 wt %, e.g. $Z_1$ is 0.35 and $Z_2$ is 0.9 wt %, e.g. $Z_1$ is 0.35 and $Z_2$ is 0.8 wt %, for example $Z_1$ is 0.35 and $Z_2$ is 0.7 wt %, or, alternatively, for example $Z_1$ is 0.35 and $Z_2$ is 0.6 wt %.

In a further embodiment according to the present invention, the semiconductive polymer composition, as described herein, is disclosed wherein the crosslinking agent is present in an amount as defined herein, wherein $Z_1$ is 0.02. In further embodiments of the present invention, a semiconductive polymer composition, as described herein, is disclosed, wherein $Z_1$ is 0.02, 0.04, 0.06 or 0.08.

A further embodiment of the present invention, discloses a semiconductive polymer composition, as described herein, wherein $Z_1$ is 0.3.

Still a further embodiment of the present invention, discloses a semiconductive polymer composition, as described herein, wherein $Z_2$ is 0.8, 0.9 or 1.0.

Even further, embodiments of the semiconductive polymer composition according to the 30 present invention, as described herein, are disclosed, wherein $Z_1$ is, for example, 0.1 or 0.2 and/or $Z_2$ is, for example, 1.4, or 1.3.

Still further, embodiments of the semiconductive polymer composition according to the present invention, as described herein, are disclosed, wherein $Z_1$ is, for example, 0.25 or 0.30 and/or $Z_2$ is, for example, 0.8, or 1.0.

Suitable aliphatic mono- or bifunctional peroxide, and monofunctional peroxide containing an aromatic group, include 2,5-dimethyl-2,5-di(tert-butylperoxy)hexane, 2,5-dimethyl-2,5-di(tert-butylperoxy)hexyne-3 and tert-butyl cumyl peroxide.

In further embodiments of the present invention, a semiconductive polymer composition, as described herein, is disclosed, wherein the crosslinking agent comprises 2,5-dimethyl-2,5-di(tert-butylperoxy)hexane, 2,5-dimethyl-2,5-di(tert-butylperoxy)hexyne-3 and/or tert-butyl cumyl peroxide.

In a further embodiment according to the present invention, the crosslinking agent comprises 2,5-dimethyl-2,5-di(tert-butylperoxy)hexyne-3.

In even a further embodiment according to the present invention, the crosslinking agent comprises 2,5-dimethyl-2, 5-di(tert-butylperoxy)hexane.

A further embodiment of the present invention, discloses a semiconductive polymer composition, as described herein, wherein the crosslinking agent comprises less than 0.7 wt % of 2,5-dimethyl-2,5-di(tert-butylperoxy)hexane.

In a further embodiment according to the present invention, the crosslinking agent comprises 2,5-dimethyl-2,5-di (tert-butylperoxy)hexane, or less than 0.7 wt % of 2,5-dimethyl-2,5-di(tert-butylperoxy)hexane.

In still a further embodiment according to the present invention, the crosslinking agent comprises tert-butyl cumyl peroxide.

A further embodiment according to the present invention, discloses a semiconductive polymer composition which has a scorch performance, i.e. a scorch time, of at least 20 minutes, when determined in accordance with Method 6, as described herein.

In still further embodiments according to the present invention, said semiconductive polymer composition has a scorch performance, i.e. a scorch time, of at least 22, 30, 35, 40, 55 or, alternatively, 60 minutes, when determined in accordance with Method 6, as described herein.

Further, the addition of the crosslinking agent is preferably affected after an optional subsequent process step of pellet formation, as described herein.

In further embodiments of the present invention, a semiconductive polymer composition, as described herein, is disclosed, wherein the semiconductive polymer composition comprises 35 to 90 wt % of the polymer component, for example, the polar polyethylene, 10 to 60 wt % of a conducting component comprising carbon black and 0 to 8 wt % additives, wherein all wt % are based on the total semiconductive polymer composition.

The semiconductive properties of the semiconductive polymer composition result from the conducting component comprised in the semiconductive polymer composition. The conducting component is comprised in the semiconductive polymer composition in, at least, an amount that renders the semiconductive polymer composition semiconducting. Further, the conducting component is suitably a carbon black.

Depending on the desired use, the conductivity of the carbon black and conductivity of the composition, the amount of carbon black can vary. The semiconductive polymer composition comprises, for example, 10 to 60 wt %, e.g. 10 to 50 wt %, carbon black, based on the weight of the semiconductive polymer composition. In other embodiments, the lower limit of the amount of carbon black is 10 wt %, e.g. 20 wt % or, for example 25 wt %, based on the weight of the semiconductive polymer composition. The upper limit of the amount of carbon black is, for example 50 wt %, e.g. 45 wt % or, for example 41 wt %, based on the weight of the semiconductive polymer composition.

Still a further embodiment according to the present invention discloses a semiconductive polymer composition, wherein the amount of the carbon black is 10 to 60 wt %, e.g. 10 to 50 wt %, for example, 20 to 45, e.g. 30 to 40 wt %, for example, 35 to 40 wt %.

Any carbon black which is electrically conductive can be used. Further, the carbon black may have a nitrogen surface area (BET) of 5 to 400 $m^2/g$, for example of 10 to 300 $m^2/g$, e.g. of 30 to 200 $m^2/g$, when determined according to ASTM D3037-93. Further, the carbon black may have one or more of the following properties: i) a primary particle size of at least 5 nm which is defined as the number average particle diameter according to ASTM D3849-95a procedure D, ii) iodine adsorption number (IAN) of at least 10 mg/g, for example 10 to 300 mg/g, e.g. 30 to 200 mg/g, when determined according to ASTM D-1510-07; and/or iii) DBP (dibutyl phthalate) absorption number (=oil number) of at least 30 $cm^3/100$ g, for example 60 to 300 $cm^3/100$ g, e.g. 70 to 250 $cm^3/100$ g, for example 80 to 200 $cm^3/100$ g, e.g. 90 to 180 $cm^3/100$ g, when measured according to ASTM D 2414-06a.

Furthermore, the carbon black may have one or more of the following properties: a) a primary particle size of at least 5 nm which is defined as the number average particle diameter according ASTM D3849-95a, b) iodine number of at least 30 mg/g according to ASTM D1510, c) oil absorption number of at least 30 ml/100 g which is measured according to ASTM D2414. Non-limiting examples of suitable carbon blacks include furnace blacks and acetylene blacks. One group of suitable furnace blacks have a primary particle size of 28 nm or less. The mean primary particle size is defined as the number average particle diameter measured according to ASTM D3849-95a. Particularly suitable furnace blacks of this category may have an iodine number between 60 and 300 mg/g according to ASTM D1510. It is further suitable that the oil absorption number (of this category) is between 50 and 225 ml/100 g, for example between 50 and 200 ml/100 g and this is measured according to ASTM D2414.

Another group of equally suitable furnace blacks have a primary particle size of greater than 28 nm. The mean primary particle size is defined as the number average particle diameter according to ASTM D3849-95a. Suitable furnace blacks of this category have an iodine number between 30 and 200 mg/g according to ASTM D1510. Further the oil absorption number (of this category) is, for example, between 80 and 300 ml/100 g measured according to ASTM D2414.

Other suitable carbon blacks can be made by any other process or can be further treated. Suitable carbon blacks for semiconductive cable layers are suitably characterized by their cleanliness. Therefore, suitable carbon blacks have an ash-content of less than 0.2 wt % measured according to ASTM D1506, a 325 mesh sieve residue of less than 30 ppm according to ASTM D1514 and have less than 1 wt % total sulphur according to ASTM D1619.

Furnace carbon black is generally acknowledged term for the well known carbon black type that is produced in a furnace-type reactor. As examples of carbon blacks, the preparation process thereof and the reactors, reference can be made to i.a. EP629222 of Cabot, U.S. Pat. Nos. 4,391, 789, 3,922,335 and 3,401,020. As an example of commercial furnace carbon black grades described in ASTM D 1765-98b i.a. N351, N293 and N550, can be mentioned. Furnace carbon blacks are conventionally distinguished from acetylene carbon blacks which are another carbon black type suitable for the semiconductive polymer composition. Acetylene carbon blacks are produced in an acetylene black process by reaction of acetylene and unsaturated hydrocarbons, e.g. as described in U.S. Pat. No. 4,340,577. Particularly, acetylene blacks may have a particle size of larger than 20 nm, for example 20 to 80 nm. The mean primary particle size is defined as the number average particle diameter according to the ASTM D3849-95a. Suitable acetylene blacks of this category have an iodine number between 30 to 300 mg/g, for example 30 to 150 mg/g according to ASTM D1510. Further the oil absorption number (of this category) is, for example between 80 to 300 ml/100 g, e.g. 100 to 280 ml/100 g and this is measured according to ASTM D2414. Acetylene black is a generally acknowledged term and are very well known and e.g. supplied by Denka.

A further embodiment according to the present invention discloses a semiconductive polymer composition, wherein the conducting component is comprising, or is selected from, a conductive carbon black, e.g. a carbon black with one or more, for example, all, of the following properties: a primary particle size of at least 5 nm which is defined as the number average particle diameter according to ASTM D3849-95a procedure D; an iodine adsorption number (IAN) of at least 10 mg/g, e.g., 10 to 300 mg/g, when determined according to ASTM D-1510-07; or a DBP (dibutyl phthalate) absorption number (=oil absorption number) of at least 30 cm$^3$/100 g, e.g. 60 to 300 cm$^3$/100 g, when measured according to ASTM D 2414-06a.

The polymer component comprises a polar polyethylene, e.g. a low-density polyethylene (LDPE) copolymer having at least a polar comonomer.

By "polar" comonomer, it is meant a comonomer comprising at least one polar bond and which has a net electric dipole, i.e. a region of net positive charge and a region of net negative charge.

As a polar comonomer, compound(s) containing hydroxyl group(s), alkoxy group(s), carbonyl group(s), carboxyl group(s), ether group(s) or ester group(s), or a mixture thereof can used.

Further, if the polar polyethylene besides from the polar comonomer, comprises a non-polar comonomer, the non-polar comonomer is/are compound(s) not containing hydroxyl group(s), alkoxy group(s), carbonyl group(s), carboxyl group(s), ether group(s) nor ester group(s).

The polar polyethylene contributes to better dispersion of the conducting component, e.g. carbon black, increasing adhesion and improving processability.

The amount of said polymer component of said semiconductive polymer composition of the invention is preferably of from 40 to 75 wt %, more preferably of from 50 to 70 wt %.

The polymer component of the invention may optionally have an unsaturation that can preferably be provided by copolymerising ethylene with at least one polyunsaturated comonomer as defined above and/or by using a chain transfer agent, such as propylene. Such polymers are well known and described e.g. in WO 93/08222, EP 1695996 or WO2006/131266. Typically said unsaturated polyolefins have a double bond content of more than 0.1 double bonds/1000 C-atoms.

That the polyethylene is "unsaturated" means herein that the polyethylene comprises carbon carbon double bonds. Carbon carbon double bonds mean herein unsaturations. The polyethylene, as described herein, may comprise vinyl groups, for example, allyl groups. Vinyl groups are functional groups which comprise carbon carbon double bonds. The term "vinyl group" as used herein takes is conventional meaning, i.e. the moiety "—CH=CH$_2$". Further, the polyethylene may in addition comprise other functional groups also comprising carbon carbon double bonds. The other functional groups, also comprising carbon carbon double bonds, may be, e.g., vinylidene groups and/or vinylene groups. The vinylene group has either a cis or trans configuration. For the avoidance of doubt, vinylidene groups and vinylene groups are not vinyl groups as the terms are used herein.

When the polymer component of said semiconductive polymer composition comprises a polar polyethylene which is an unsaturated copolymer comprising at least one polyunsaturated comonomer, then the polyunsaturated comonomer is straight carbon chain with at least 8 carbon atoms and at least 4 carbon atoms between the non-conjugated double bonds, of which at least one is terminal.

It is well known that e.g. propylene can be used as a comonomer or as a chain transfer agent (CTA), or both, whereby it can contribute to the unsaturation, e.g. the amount of the vinyl groups in the polyethylene. Herein, when copolymerisable CTA, such as propylene, is used, the copolymerised CTA is not calculated to the origin comonomer content.

Still a further embodiment according to the present invention discloses a semiconductive polymer composition, wherein said polymer component is a polar polyethylene copolymer, where a comonomer is selected from one or more of polar comonomer(s), and the polar polyethylene copolymer may optionally comprise unsaturation provided by, for example, copolymerising ethylene with at least one polyunsaturated comonomer and/or by, for example, using a chain transfer agent, e.g. propylene.

Further, said polyunsaturated comonomer may be a diene, for example, a diene which comprises at least 8 carbon atoms, the first carbon-carbon double bond being terminal and the second carbon-carbon double bond being non-conjugated to the first one (group 1 dienes). Exemplified dienes may be selected from $C_8$ to $C_{14}$ non-conjugated dienes or mixtures thereof, for example, selected from 1,7-octadiene, 1,9-decadiene, 1,11-dodecadiene, 1,13-tetradecadiene, 7-methyl-1,6-octadiene, 9-methyl-1,8-decadiene, or mixtures thereof. In a further embodiment, the diene is selected from 1,7-octadiene, 1,9-decadiene, 1,11-dodecadiene, 1,13-tetradecadiene, or any mixture thereof.

Suitable LDPE copolymer of ethylene with at least polar comonomer(s) is copolymer of ethylene and:
  vinyl esters of monocarboxylic acids having 1 to 4 carbon atoms, such as vinyl acetate (EVA),
  (meth)acrylates of alcohols having 1 to 4 carbon atoms, such as methyl (meth)acrylate (EMA & EMMA),
  butyl acrylate (EBA),
  ethyl acrylate (EEA) and
  methyl acrylate (EMA).

The term "(meth)acrylic acid" and "(meth)acrylate" are intended to embrace both acrylic acid and methacrylic acid and, respectively "methacrylate" and "acrylate".

A further embodiment according to the present invention discloses a semiconductive polymer composition, wherein said polymer component is
  a polar polyethylene copolymer where a comonomer is selected from one or more of polar comonomer(s) and is/are selected from:
  vinyl carboxylate esters, such as vinyl acetate and vinyl pivalate, (meth)acrylates, such as methyl(meth)acrylate, ethyl(meth)acrylate, butyl(meth)acrylate and hydroxyethyl(meth)acrylate, olefinically unsaturated carboxylic acids, such as (meth)acrylic acid, maleic acid and fumaric acid, (meth)acrylic acid derivatives, such as (meth)acrylonitrile and (meth)acrylic amide, vinyl ethers, such as vinyl methyl ether and vinyl phenyl ether; or
  a polar polyethylene copolymer being a copolymer of ethylene with one or more of vinyl esters of monocarboxylic acids having 1 to 4 carbon atoms, e.g. vinyl acetate, or of (meth)acrylates of alcohols having 1 to 4 carbon atoms, or of a mixture thereof, for example, of methyl (meth)acrylate, ethyl (meth)acrylate or butyl (meth)acrylate, wherein an exemplified subgroup of said polar polyethylene copolymer of ethylene with at least polar comonomer(s) is a polar polyethylene copolymer of ethylene with at least vinyl acetate, polar polyethylene copolymer of ethylene with at least methyl acrylate, a polar polyethylene copolymer of ethylene with at least ethyl acrylate or a polar polyethylene copolymer of ethylene with at least butyl acrylate; or any mixture thereof.

An even further embodiment according to the present invention discloses a semiconductive polymer composition, wherein said polymer component is a polar polyethylene copolymer where a comonomer is selected from one or more of polar comonomer(s) and is/are selected from:

vinyl carboxylate esters, such as vinyl acetate and vinyl pivalate, (meth)acrylates, such as methyl(meth)acrylate, ethyl(meth)acrylate, butyl(meth)acrylate and hydroxyethyl (meth)acrylate, olefinically unsaturated carboxylic acids, such as (meth)acrylic acid, maleic acid and fumaric acid, (meth)acrylic acid derivatives, such as (meth)acrylonitrile and (meth)acrylic amide, vinyl ethers, such as vinyl methyl ether and vinyl phenyl ether.

An even further embodiment according to the present invention discloses a semiconductive polymer composition, wherein said polymer component is a polar polyethylene copolymer being a copolymer of ethylene with one or more of vinyl esters of monocarboxylic acids having 1 to 4 carbon atoms, e.g. vinyl acetate, or of (meth)acrylates of alcohols having 1 to 4 carbon atoms, or of a mixture thereof, for example, of methyl (meth)acrylate, ethyl (meth)acrylate or butyl (meth)acrylate, wherein an exemplified subgroup of said polar polyethylene copolymer of ethylene with at least polar comonomer(s) is a polar polyethylene copolymer of ethylene with at least vinyl acetate, polar polyethylene copolymer of ethylene with at least methyl acrylate, a polar polyethylene copolymer of ethylene with at least ethyl acrylate or a polar polyethylene copolymer of ethylene with at least butyl acrylate, or any mixture thereof.

More preferably, said LDPE copolymer of ethylene with at least polar comonomer(s) is a LDPE copolymer of ethylene with one or more of vinyl esters of monocarboxylic acids having 1 to 4 carbon atoms, such as vinyl acetate, or of (meth)acrylates of alcohols having 1 to 4 carbon atoms, or of a mixture thereof, preferably of methyl (meth)acrylate, ethyl (meth)acrylate or butyl (meth)acrylate. The preferred subgroup of said LDPE copolymer of ethylene with at least polar comonomer(s) is a LDPE copolymer of ethylene with at least vinyl acetate, LDPE copolymer of ethylene with at least methyl acrylate, a LDPE copolymer of ethylene with at least ethyl acrylate or a LDPE copolymer of ethylene with at least butyl acrylate, or any mixture thereof.

The content of polar comonomer in said LDPE copolymer of ethylene with at least polar comonomer(s) as defined above, that is most preferable as said polymer component is not limited and may be of up to 70 wt %, preferably of 0.5 to 35 wt %, more preferably of 1.0 to 35 wt %, of the total amount of said LDPE copolymer.

The amount of polar group containing comonomer units in the polar polyethylene is from 5 to 40 wt %, in suitably from 10 to 30 wt %, and yet more suitably from 10 to 25 wt %. In a suitable embodiment, the total amount of polar comonomers in the polar polyethylene is from 1 wt % to 20 wt %, suitably 5 wt % to 20 wt %.

A further embodiment according to the present invention discloses a semiconductive polymer composition, wherein the content of polar comonomer in said polar polyethylene copolymer of ethylene with at least polar comonomer(s) e.g. as said polymer component is not limited and may be of up to 70 wt %, for example, 0.5 to 35 wt %, e.g. 1.0 to 35 wt %, of the total amount of said polar polyethylene copolymer.

Further, the content of polar comonomer in said polar polyethylene copolymer of ethylene with at least polar comonomer(s) e.g. as said polymer component may in further embodiments be of up to 60 wt %, up to 55 wt %, up to 50 wt %, up to 45 wt %, or up to 40 wt %.

Furthermore, the content of polar comonomer in said polar polyethylene copolymer of ethylene with at least polar comonomer(s) e.g. as said polymer component may in even further embodiments be for example, 0.5 to 40 wt %, e.g. 1.0 to 40 wt %, for example, 2 to 40 wt %, e.g. 3 to 40 wt %, for example, 4 to 40 wt %, e.g. 5 to 40 wt %, for example, 2 to 35 wt %, e.g. 3 to 35 wt %, for example, 4 to 35 wt %, e.g. 5 to 35 wt %, for example, 0.5 to 30 wt %, e.g. 1.0 to 30 wt %, for example, 2 to 30 wt %, e.g. 3 to 30 wt %, or for example, 4 to 30 wt %, e.g. 5 to 30 wt %, of the total amount of said polar polyethylene copolymer. Further, especially suitable comonomers are butyl acrylate, ethyl acrylate and methyl acrylate.

High pressure polymerisation for producing said LDPE homo or copolymer and the subgroups as defined herein, is a well known technology in the polymer field and can be affected in a tubular or an autoclave reactor, preferably, in a tubular reactor. The high pressure polymerisation is carried out suitably in a known manner, e.g. at temperature range from 80 to 350° C. and pressure of from 100 to 400 MPa typically in the presence of an initiator of the free radical/polymerisation reaction. Further details about high pressure radical polymerisation are given in WO 93/08222. The polymerisation of the high pressure process is generally performed at pressures of from 1200 to 3500 bar and temperatures of from 150 to 350° C.

MFR21, of said semiconductive polymer composition may typically be at least 1.0 g/10 min, suitably at least 3.0 g/10 min, preferably at least 5.0 g/10 min, more preferably at least 6.0 g/10 min, even more preferably at least 8.0 g/10 min, when measured according to ISO1133, 21.6 kg load, 190° C. MFR21 is measured on said semiconductive composition(s) in absence of crosslinking agent. The upper limit MFR21 of said semiconductive polymer composition is not limited and may be e.g. up 100 g/10 min, such as up to 80 g/10 min, preferably up to 60 g/10 min, more preferably up to 50 g/10 min, when determined as defined above.

According to the invention said semiconductive polymer composition is in the form of pellets. The term pellets include herein granules and pellets of any shape and type and are very well known and can be produced in known manner using the conventional pelletising equipment.

Said semiconductive polymer composition may comprise further components, typically additives, such as antioxidants, crosslinking boosters, scorch retardants, processing aids, fillers, coupling agents, ultraviolet absorbers, stabilizers, antistatic agents, nucleating agents, slip agents, plasticizers, lubricants, viscosity control agents, tackifiers, antiblocking agents, surfactants, extender oils, acid scavengers and/or metal deactivators.

Examples of such antioxidants are as follows, but are not limited to: hindered phenols such as tetrakis[methylene(3,5-di-tert-butyl-4-hydroxyhydro-cinnamate)]methane; bis[(beta-(3,5-ditert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)hydrocinnamate; phosphites and phosphonites such as tris(2,4-di-tert-butylphenyl)phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha,alpha-demthylbenzyl)diphenylamine, diphenyl-p-phenylenediamine, mixed di-aryl-p-phenylenediamines, 2,2'-oxamido bis-(ethyl-3-(3,5-di-tert·butyl-4-hydroxyphenyl)propionate), and other hindered amine antidegradants or stabilizers. Antioxidants can be used in amounts of about 0.1 to about 5 percent by weight based on the weight of the composition.

The semiconductive polymer composition of the invention may comprise further components, e.g. additives and/or further polymer components. Examples of fillers as additives are as follows: clays, precipitated silica and silicates, fumed silica, calcium carbonate, ground minerals, and further carbon blacks. Fillers can be used in amounts ranging from less than about 0.01 to more than about 50 percent by weight based on the weight of the composition.

The mixing after introducing the polymer component and optional additives in the preparation process is affected at elevated temperature and results typically in melt mixing, typically more than 10° C. above, preferably more than 25° C., above the melting point of the polymer component(s) and below the undesired degradation temperature of the components, preferably below 250° C., more preferably below 220° C., more preferably of from 155 to 210° C., depending on the used polymer material.

Preferably said preparation process of the invention further comprises a step of pelletising the obtained polymer mixture. Pelletising can be affected in well known manner using a conventional pelletising equipment, such as preferably conventional pelletising extruder which is integrated to said mixer device. The process of the invention can be operated in batch wise or in continuous manner.

Apparatuses used for carrying out the method of the invention are for example single screw or twin screw mixer or a kneading extruder, or a combination thereof, which is preferably integrated to a pelletising device. The apparatus(es) may be operated in batch wise or, preferably, in continuous manner. The process may comprise a further subsequent sieving step before preferable pelletising step which is also conventionally used in the state of the art in the preparation of semiconductive polymer compositions to limit the number of large particles.

The invention further relates to the use of the semiconductive polymer composition in pellet form for the production of a semiconductive layer of an electric power cable. A further aspect of the present invention relates to an electric power cable comprising at least one semiconductive layer, which layer is obtained by extrusion or co-extrusion of the semiconductive polymer composition as described above.

Preferably, the power cable may comprise a conductor, an inner semiconductive layer (a), an insulation layer (b) and an outer semiconductive layer (c), each coated on the conductor in this order, wherein at least one of the inner and outer semiconductive layer(s) (a;c) comprises a semiconductive polymer composition according to the present invention as described above.

In a further preferred embodiment of the inventive power cable both the inner (a) and outer (c) semiconductive layers, comprise, more preferably consist of, the semiconductive polymer composition according to the present invention.

In a further preferable embodiment, at least one of the inner and outer semiconductive layers (a;c) is crosslinkable, preferably both inner (a) and outer (c) semiconductive layers are crosslinkable.

The insulation layer (b) is well known in power cable field and can comprise any polymeric material suitable and/or conventionally used for such insulation layer. Also the insulation layer (b) is preferably crosslinkable.

Accordingly, the invention provides a process for producing a power cable, wherein the process comprises blending the semiconductive polymer composition of the invention as defined above including any subgroups thereof, optionally with other polymer components and optionally with additives, above the melting point of at least the major polymer component(s) of the obtained mixture, and extruding the obtained melt mixture on a conductor for forming at least one semiconductive polymer layer on a conductor for a power cable. The processing temperatures and devices are well known in the art. Preferably, said semiconductive polymer composition of the invention is used in form of pellets which are added to the mixing step and melt mixed.

Preferably, the semiconductive polymer composition is co-extruded on the conductor together with one or more further cable layer(s) forming polymeric composition(s), thus providing a multilayered power cable, preferably a multilayered power cable as defined above. After providing the layered power cable structure, preferably the multilayered power cable as defined above, the obtained cable is then crosslinked in the subsequent crosslinking step, i.e. said cable preparation process comprises a further step of crosslinking the obtained power cable as defined above, by reacting said at least one semiconductive layer which comprises said semiconductive polymer composition as defined above and which layer is crosslinkable, with said crosslinking agent via radical reaction.

Preferably, said at least one semiconductive cable layer is crosslinked during the preparation process of said cable via radical reaction using the crosslinking agent.

The crosslinking step is suitably affected as an integrated subsequent step of the cable preparation process in a crosslinking zone. The crosslinking can be affected at a temperature of typically at least 160° C. and above, e.g. above 170° C., for example above 180° C., as well known. The crosslinked cable is then recovered and further processed if needed.

Suitably crosslinking of cable is crosslinking via radical reaction using the crosslinking agent as defined herein.

Thus, also said crosslinked cables, obtained by the crosslinking method via radical reaction using the crosslinking agent as defined herein, are also provided.

A further embodiment of the present invention discloses a process for producing a semiconductive polymer composition as described herein, the process comprising blending the polymer component with the conducting component and the crosslinking agent.

End Applications

An embodiment of the present invention provides an article obtained from process comprising use of a semiconductive polymer composition as described herein, wherein the article is, for example, a cable, e.g. a power cable.

A further embodiment of the present invention provides an article, which is obtained from the semiconductive polymer composition as described herein.

Still a further embodiment of the present invention provides an article comprising semiconductive layer(s) which is/are obtained from a semiconductive polymer composition as described herein, wherein the article is, for example, a cable, e.g. a power cable.

According to another embodiment of a power cable, the outer semiconductive layer may be strippable or non-strippable, preferably non-strippable, i.e. bonded. These terms are known and describe the peeling property of the layer, which may be desired or not depending on the end application.

In a further embodiment of the power cable, the outer semiconductive layer is non-strippable, i.e. bonded.

In case of strippable semiconductive layer, the polymer component is usually more polar having a content of polar comonomer(s) of at least 20.0 wt %, such as at least 25.0 wt %, preferably at least 26.0 wt % more preferably from 27.0 to 35.0 wt %, based on the total amount of the polymer component, and may contain further polar components to contribute to strippability.

In a further embodiment of the power cable, the outer semiconductive layer is non-strippable and has a content of polar comonomers of less than 25.0 wt %, preferably less than 20.0 wt %, more preferable of from 10.0 to 18.0 wt %, based on the total amount of the polymer component. In some embodiments a polar comonomer content as low as 6.0 to 15.0 wt % based on the total amount of the polymer component, may be desired.

In the cases of both strippable and non-strippable semiconductive layers, respectively, the layers are preferably crosslinkable.

In a further embodiment of the present invention an article is provided, wherein said article is crosslinkable and is obtained from the semiconductive polymer composition as described herein.

In still a further embodiment of the present invention an article is provided, wherein said article comprises the semiconductive polymer composition as described herein.

In a further embodiment of the present invention an article is provided, wherein said article is crosslinked and is obtained from the semiconductive polymer composition as described herein.

A further embodiment of the present invention provides an article, which is a cable, e.g. a power cable.

Further, the invention is highly suitable for W&C applications, whereby an article is e.g. a cable, which is crosslinkable and comprises one or more layers, wherein at least one layer is obtained from the semiconductive polymer composition as described herein.

Furthermore, still a further embodiment of the present invention is provided, wherein said at least one layer comprises the semiconductive polymer composition as described herein.

A further embodiment of the present invention provides a power cable, which is obtained from the semiconductive polymer composition as described herein.

Still a further embodiment of the present invention is provided, wherein said article is an alternating current (AC) power cable.

A further embodiment of the present invention is provided wherein said article is a direct current (DC) power cable.

Further, the at least one layer of the cable obtained from the semiconductive polymer composition may, e.g., be a semiconductive layer.

Furthermore, the at least one layer of the cable comprising the semiconductive polymer composition may, e.g., be a semiconductive layer.

Further, the cable of the present invention may, for example, be a power cable which comprises at least an inner semiconductive layer, an insulation layer and an outer semiconductive layer in given order, wherein the semiconductive layer(s) is/are obtained from the semiconductive polymer composition as described herein.

In a further embodiment the semiconductive layer(s) comprise the semiconductive polymer composition as described herein.

The power cable means herein a cable that transfers energy operating at any voltage. The voltage applied to the power cable can be alternating (AC), direct (DC), or transient (impulse). In an embodiment, the multi-layered article is a power cable operating at voltages higher than 6 kV.

A further embodiment of the present invention discloses a process for producing an article, as described herein, which process comprises use of a semiconductive polymer composition, as described herein.

Determination Methods

Unless otherwise stated in the description or experimental part the following methods were used for the property determinations.

Wt %=weight percent

Comonomer Content:

The content (wt % and mol %) of polar comonomer present in the polymer and the content (wt % and mol %) of silane groups containing units (preferably comonomer) present in the polymer composition, here meaning also the semiconductive polymer composition, (preferably in the polymer):

Quantitative nuclear-magnetic resonance (NMR) spectroscopy was used to quantify the comonomer content of the polymer in the polymer composition. Quantitative 1H NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-d2 (TCE-d2) using ditertiarybutylhydroxytoluen (BHT) (CAS 128-37-0) as stabiliser.

Standard single-pulse excitation was employed utilising a 30 degree pulse, a relaxation delay of 3 s and no sample rotation. A total of 16 transients were acquired per spectra using 2 dummy scans. A total of 32 k data points were collected per FID with a dwell time of 60 s, which corresponded to a spectral window of approx. 20 ppm. The FID was then zero filled to 64 k data points and an exponential window function applied with 0.3 Hz line-broadening. This setup was chosen primarily for the ability to resolve the quantitative signals resulting from methylacrylate and vinyltrimethylsiloxane copolymerisation when present in the same polymer.

Quantitative 1H NMR spectra were processed, integrated and quantitative properties determined using custom spectral analysis automation programs. All chemical shifts were internally referenced to the residual protonated solvent signal at 5.95 ppm.

When present characteristic signals resulting from the incorporation of vinylacytate (VA), methyl acrylate (MA), butylacrylate (BA) and vinyltrimethylsiloxane (VTMS), in various comonomer sequences, were observed (see J. Randall, Macromol. Sci., Rev. Macromol. Chem. Phys. 1989, C29, 201). All comonomer contents calculated with respect to all other monomers present in the polymer.

The vinylacytate (VA) incorporation was quantified using the integral of the signal at 4.84 ppm assigned to the *VA sites, accounting for the number of reporting nuclie per comonomer and correcting for the overlap of the OH protons from BHT when present:

$$VA=(I*VA-(IArBHT)/2)/1$$

The methylacrylate (MA) incorporation was quantified using the integral of the signal at 3.65 ppm assigned to the 1MA sites, accounting for the number of reporting nuclie per comonomer:

$$MA=I1MA/3$$

The butylacrylate (BA) incorporation was quantified using the integral of the signal at 4.08 ppm assigned to the 4BA sites, accounting for the number of reporting nuclie per comonomer:

$$BA=I4BA/2$$

The vinyltrimethylsiloxane incorporation was quantified using the integral of the signal at 3.56 ppm assigned to the 1VTMS sites, accounting for the number of reporting nuclei per comonomer:

VTMS=I1VTMS/9

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

BHT=IArBHT/2

The ethylene comonomer content was quantified using the integral of the bulk aliphatic (bulk) signal between 0.00-3.00 ppm. This integral may include the iVA (3) and α VA (2) sites from isolated vinylacetate incorporation, *MA and α MA sites from isolated methylacrylate incorporation, 1BA (3), 2BA (2), 3BA (2), *BA (1) and a BA (2) sites from isolated butylacrylate incorporation, the *VTMS and a VTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

E=(¼)*[Ibulk−5*VA−3*MA−10*BA−3*VTMS−21*BHT]

It should be noted that half of the a signals in the bulk signal represent ethylene and not comonomer and that an insignificant error is introduced due to the inability to compensate for the two saturated chain ends (S) without associated branch sites.

The total mole fractions of a given monomer (M) in the polymer was calculated as:

fM=M/(E+VA+MA+BA+VTMS)

The total comonomer incorporation of a given monomer (M) in mole percent was calculated from the mole fractions in the standard manner:

M [mol %]=100*fM

The total comonomer incorporation of a given monomer (M) in weight percent (wt %) was calculated from the mole fractions and molecular weight of the monomer (MW) in the standard manner:

M [wt %]=100*(fM*MW)/((fVA*86.09)+ (fMA*86.09)+(fBA*128.17)+(fVTMS*148.23)+ ((1−fVA−fMA−fBA−fVTMS)*28.05)), see also J. Randall, Macromol. Sci., Rev. Macromol. Chem. Phys. 1989, C29, 201.

It is evident for a skilled person that the above principle can be adapted similarly to quantify content of any further polar comonomer(s) which is other than MA BA and VA, if within the definition of the polar comonomer as given in the present application, and to quantify content of any further silane groups containing units which is other than VTMS, if within the definition of silane groups containing units as given in the present application, by using the integral of the respective characteristic signal.

The present invention will be further illustrated by means of the following examples:

Method 1—Preparation of Crosslinked Plaque Using 1,3 1,4-bis(tert-butylperoxyisopropyl)benzene (CAS: 25155-25-3) as Peroxide The crosslinked plaque is prepared from of pellets of the test semiconductive polymer composition, i.e. here the comparative semiconductive polymer composition, which were compression moulded using the following conditions: First the pellets are melted at 120° C. for 1 min under a pressure of 61 N/cm². Then the temperature is increased to 180° C. at a rate of 18 K/min and at the same time the pressure is increased to 614 N/cm². The temperature is maintained at 180° C. for 26 min. The plaques then become crosslinked by means of the peroxide present in the semiconductive polymer composition. The total crosslinking time includes the time for increasing the temperature from 120 to 180° C. After completed crosslinking the crosslinked plaques, i.e. here the crosslinked comparative semiconductive polymer composition, is cooled to room temperature with a cooling rate of 15 K/min still under pressure. The thickness of the plaques is 1.5 mm.

Method 2—Preparation of Crosslinked Plaque using tert-butylcumylperoxide (CAS: 3457-61-2) as Peroxide The crosslinked plaque is prepared from of pellets of the test semiconductive polymer composition, i.e. the semiconductive polymer composition according to the present invention and the comparative semiconductive polymer composition, which were compression moulded using the following conditions: First the pellets are melted at 120° C. for 1 min under a pressure of 61 N/cm². Then the temperature is increased to 180° C. at a rate of 18 K/min and at the same time the pressure is increased to 614 N/cm². The temperature is maintained at 180° C. for 24 min. The plaques then become crosslinked by means of the peroxide present in the semiconductive polymer composition. The total crosslinking time includes the time for increasing the temperature from 120 to 180° C. After completed crosslinking the crosslinked plaques, i.e. the crosslinked semiconductive polymer composition according to the present invention and the crosslinked comparative semiconductive polymer composition, is cooled to room temperature with a cooling rate of 15 K/min still under pressure. The thickness of the plaques is 1.5 mm.

Method 3—Preparation of Crosslinked Plaque Using 2,5-Dimethyl-2,5-Di-(Tert-butylperoxy)hexyne-3 (CAS: 1068-27-5) as Peroxide The crosslinked plaque is prepared from of pellets of the test semiconductive polymer composition, i.e. the semiconductive polymer composition according to the present invention and the comparative semiconductive polymer composition, which were compression moulded using the following conditions: First the pellets are melted at 120° C. for 1 min under a pressure of 61 N/cm². Then the temperature is increased to 190° C. at a rate of 18 K/min and at the same time the pressure is increased to 614 N/cm². The temperature is maintained at 190° C. for 20 min. The plaques then become crosslinked by means of the peroxide present in the semiconductive polymer composition. The total crosslinking time includes the time for increasing the temperature from 120 to 180° C. After completed crosslinking the crosslinked plaques, i.e. the crosslinked semiconductive polymer composition according to the present invention and the crosslinked comparative semiconductive polymer composition, is cooled to room temperature with a cooling rate of 15 K/min still under pressure. The thickness of the plaques is 1.5 mm.

Method 4—Gas Chromatography (GC)-Analysis Protocol

The volatile peroxide decomposition products, e.g. methane ($CH_4$), content is given in ppm (weight) and is determined by gas chromatography (GC) from a crosslinked sample of the semiconductive polymer composition according to the present invention and of the comparative semiconductive polymer composition. Said crosslinking has been performed as described in method 1, method 2, and method 3 respectively.

A sample specimen with a thickness of 1.5 mm and with a weight of 1 g is cut from the middle of the crosslinked plaque, i.e. the crosslinked semiconductive polymer composition according to the present invention and the crosslinked comparative semiconductive polymer composition, directly after the crosslinking step is complete. The obtained sample is placed in a 120 ml head space bottle with an aluminium crimp cup with teflon seal and heat treated at 60° C. for 1.5 h to equilibrate any gaseous volatiles present in said sample. Then 0.2 ml of the gas captured in the sample bottle is injected into the gas chromatograph, wherein the presence and content of the volatiles, e.g. methane, which are desired to be measured is analysed. Double samples are analysed. The instrument used herein was an Agilent GC 7890A with an $Al_2O_3/Na_2SO_4$-column with the dimensions 0.53 mm×50 m and a film thickness of 10 μm, supplied by Plot Ultimetal. Helium was used as carrier gas and FID detection was used.

Method 5—Hot Set

The hot set elongation as well as the permanent deformation were determined on samples taken from crosslinked plaques, i.e. the crosslinked semiconductive polymer composition according to the present invention and of the crosslinked comparative semiconductive polymer composition. These properties were determined according to IEC 60811-507:2012. In the hot set test, a dumbbell of the tested material is equipped with a weight corresponding to 20 $N/cm^2$. This specimen is put into an oven at 200° C. and after 15 minutes, the hot set elongation is measured. Subsequently, the weight is removed and the sample is allowed to relax for 5 minutes. Then, the sample is taken out from the oven and is cooled down to room temperature. The permanent deformation is determined. The crosslinked plaques were prepared as described under Preparation of crosslinked plaque, i.e. method 1, method 2, and method 3 respectively, and the dumbbells specimens are prepared from a 1.5 mm thick crosslinked plaque according to ISO 527-2/5A:2012

Method 6—Scorch Performance Method

The test sample is prepared by pressing a plaque with a 40 mm diameter and thickness of 3.05 mm from pellets of the test semiconductive polymer composition, i.e. the semiconductive polymer composition according to the present invention and the comparative semiconductive polymer composition. The sample is warmed for 2 min at 120° C. and pressed at 0.4 bar pressure for 2 min at 120° C. The sample plaque is then cooled to ambient conditions in 6 min. The rheometer used was a MDR 2000 and the sample plaque was evaluated at 150° C. giving a torque-time curve for the tested composition. The scorch time was determined as the time from the minimum torque until a torque increase of 1.00 dNm.

EXPERIMENTAL PART

Examples

Inventive Examples 1-2, and Comparative Example 1: Semiconductive polymer composition of the invention, and comparative semiconductive polymer composition.

EBA 17 wt % is an ethylene copolymer with 17 wt % of a comonomer of butyl acrylate and is produced in a high pressure radical process. The $MFR_2$ is 7 g/10 min and the density of 926 $kg/m^3$.

60.2 wt % of conventional ethylene butyl acrylate (EBA) copolymer, produced in a high pressure process via radical polymerisation, and having the following properties: $MFR_2$ of 7 g/10 min (ISO 1133, load 2.16, 190° C.), butyl acrylate (BA) comonomer content of 17 wt %, density 926 $kg/m^3$ (ASTM D792), was fed together with 0.8 wt % of commercially available antioxidant (polymerized 2,2,4-trimethyl-1,2-dihydroquinoline) TMQ, and 39 wt % of a commercially available furnace black, i.e. a conducting component, was also added.

The semiconductive polymer composition was compounded by means known to those skilled in the art. Suitable compounding equipment includes internal mixers such as Banbury or Bolling, continuous single screws such as BUSS mixer, or continuous twin screws such as Farrel, or continuous mixer such as Werner & Pfleiderer. The type of mixer as well as the chosen operating conditions will have an effect on properties such as melt flow, volume resistivity and surface smoothness.

The carbon black used for preparing the semiconductive polymer compositions of the examples was a commercially available furnace carbon black, having iodine adsorption number of 150-170 g/kg (ASTM D-1510), oil adsorption number of 106-116 ml/100 g (ASTM D-2414), mean primary particle size of 11-20 nm (ASTM D-3849) and supplied in a pellet form.

The crosslinking agent was added to the semiconductive polymer compositions by distributing the crosslinking agent (crosslinking agent is in a liquid form) at 70° C. onto the pellets. The wet pellets were kept at 60° C. until the pellets became dry.

The comparative semiconductive polymer composition, i.e. Comparative Example 1, comprised 0.5% 1,3 1,4-bis (tert-butylperoxyisopropyl)benzene (CAS 25155-25-3) as crosslinking agent, the first inventive semiconductive polymer composition, i.e. Inventive Example 1, comprised 0.5% 2,5-dimethyl-2,5-di(tert-butylperoxy)hexyne-3 (CAS 1068-27-5) as crosslinking agent, and the second inventive semiconductive polymer composition, i.e. Inventive Example 2, comprised 0.5% tert-butyl cumyl peroxide (CAS 3457-61-2) as crosslinking agent, as shown in Table 1.

TABLE 1

| Semiconductive polymer composition | | |
|---|---|---|
| Example | Crosslinking agent | Composition concentration (%) |
| Comparative example 1 | 1,3 1,4-bis(tert-butylperoxyisopropyl)benzene | 0.5 |
| Inventive example 1 | 2,5-dimethyl-2,5-di(tert-butylperoxy)hexyne-3 | 0.5 |
| Inventive example 2 | tert-butyl cumyl peroxide | 0.5 |

The semiconductive polymer compositions were analysed with respect to hot set (Method 5), scorch performance (Method 6), and methane formation (Method 4). The results are given in Table 2.

TABLE 2

| Example | Hot set (%) | Scorch performance (min) | Methane (ppm) |
|---|---|---|---|
| Comparative example 1 | 38 | 17 | 141 |
| Inventive example 1 | 34 | 72 | 82 |
| Inventive example 2 | 58 | 24 | 111 |

It can be seen that the inventive examples have superior scorch performance compared to the comparative example. Additionally, the formed methane contents are lower for the inventive examples compared to the comparative one. This would enable a reduced degassing time.

In addition, it can be seen in the table above that with same peroxide loading of traditional 1,3 1,4-bis(tert-butylperoxyisopropyl)benzene (the comparative Example) and of 2,5-dimethyl-2,5-di(tert-butylperoxy)hexyne-3 (the inventive Example), the same hot set and crosslinking density are achieved while scorch performance is significantly improved together with a roughly 50% reduction in methane formation.

The invention claimed is:

1. A cable comprising a semiconductive polymer composition, wherein the semiconductive polymer composition comprises:
   a polymer component,
   a conducting component, and
   a crosslinking agent,
   wherein:
      the polymer component comprises a polar polyethylene, wherein the polar polyethylene is a polyethylene copolymer with one or more polar comonomers selected from (meth)acrylates, olefinically unsaturated carboxylic acids, (meth)acrylic acid derivatives, and vinyl ethers; and
      the crosslinking agent is selected from 2,5-dimethyl-2,5-di(tert-butylperoxy)hexane and/or tert-butyl cumyl peroxide; and
      the crosslinking agent is present in an amount which is Z wt %, based on a total amount (100 wt %) of the semiconductive polymer composition, and $0.2 \leq Z \leq 1.5$.

2. The cable according to claim 1, wherein the polar polyethylene is a low-density polyethylene (LDPE) copolymer having at least a polar comonomer.

3. The cable according to claim 1, wherein the polar polyethylene further comprises unsaturation provided by copolymerizing ethylene with at least one polyunsaturated comonomer and/or by using a chain transfer agent or propylene.

4. The cable according to claim 1, wherein the one or more polar comonomers are selected from methyl(meth)acrylate, ethyl(meth)acrylate, butyl(meth)acrylate, hydroxyethyl(meth)acrylate, (meth)acrylic acid, maleic acid, fumaric acid, (meth)acrylonitrile, (meth)acrylic amide, vinyl methyl ether, or vinyl phenyl ether.

5. The cable according to claim 1, wherein the polar polyethylene is a polyethylene copolymer of ethylene with at least methyl acrylate, a polyethylene copolymer of ethylene with at least ethyl acrylate, or a polyethylene copolymer of ethylene with at least butyl acrylate.

6. The cable according to claim 1, wherein a content of the one or more polar comonomers in the polar polyethylene copolymer is up to 70 wt % of a total amount of the polar polyethylene.

7. The cable according to claim 1, wherein a content of one or more polar comonomers in the polar polyethylene is 0.5 to 35 wt % or 1.0 to 35 wt % of a total amount of the polar polyethylene.

8. The cable according to claim 1, wherein the semiconductive polymer composition comprises:
   35 to 90 wt % of the polymer component,
   10 to 60 wt % of a conducting component comprising carbon black, and
   0 to 8 wt % additives,
   wherein all wt % are based on the total amount of the semiconductive polymer composition.

9. The cable according to claim 1, wherein the conducting component comprises carbon black and the carbon black is present in an amount from 10 to 60 wt %, 10 to 50 wt %, 20 to 45 wt %, 30 to 40 wt %, or 35 to 40 wt %, based on the total amount of the semiconductive polymer composition.

10. The cable according to claim 1, wherein the conducting component comprises a conductive carbon black with one or more of the following properties:
   a primary particle size of at least 5 nm which is defined as a number average particle diameter according to ASTM D3849-95a procedure D;
   an iodine adsorption number (IAN) of at least 10 mg/g when determined according to ASTM D-1510-07; or
   a DBP (dibutyl phthalate) absorption number (oil number) of at least 30 cm$^3$/100 g when measured according to ASTM D 2414-06a.

11. The cable according to claim 10, wherein:
   the iodine adsorption number (IAN) of the conductive carbon black is from 10 to 300 mg/g when determined according to ASTM D-1510-07;
   the DBP (dibutyl phthalate) absorption number (oil number) of the conductive carbon black is from 60 to 300 cm$^3$/100 g when measured according to ASTM D 2414-06a;
   or a combination thereof.

12. The cable according to claim 1, wherein the crosslinking agent comprises 2,5-dimethyl-2,5-di(tert-butylperoxy)hexane.

13. The cable according to claim 1, wherein the crosslinking agent comprises tert-butyl cumyl peroxide.

14. The cable according to claim 1, wherein Z is from 0.3 to 1.0.

15. The cable according to claim 1, wherein the semiconductive polymer composition has a scorch performance, (scorch time) of at least 20 minutes when determined in accordance with Method 6.

16. The cable according to claim 1, wherein the cable is a power cable.

17. A process for producing the cable according to claim 1, which process comprises using the semiconductive polymer composition to produce the cable, wherein the process comprises extruding the semiconductive polymer composition onto a conductor, thereby forming at least one semiconductive polymer layer on a conductor.

* * * * *